July 11, 1972  H. WILSCH ET AL  3,675,996
FILM TRANSPORTING MECHANISM FOR CINEMATOGRAPHIC APPARATUS
Filed April 2, 1970
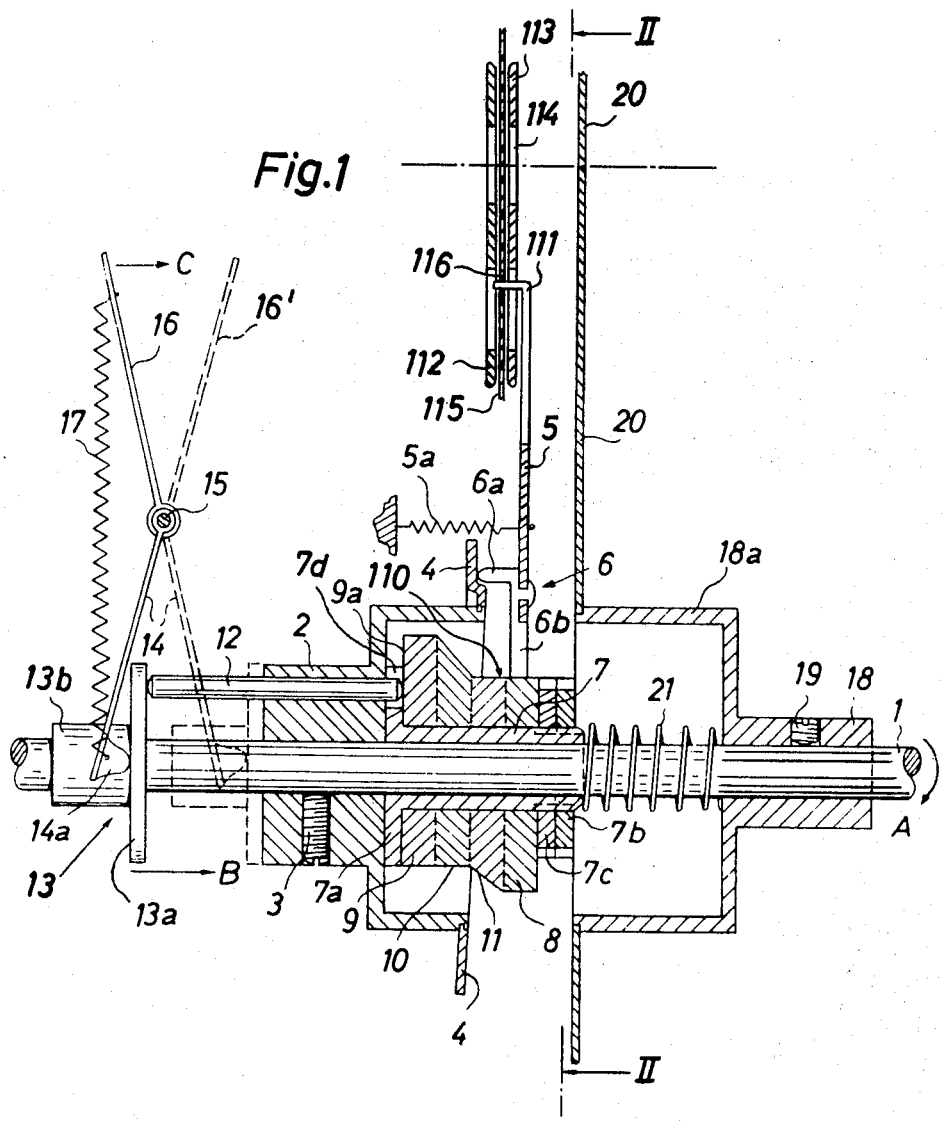
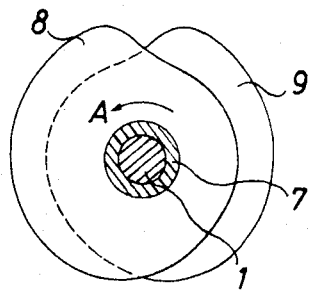
INVENTOR.
HERBERT WILSCH
HERMANN MÜLLER
BY

United States Patent Office 3,675,996
Patented July 11, 1972

3,675,996
FILM TRANSPORTING MECHANISM FOR CINEMATOGRAPHIC APPARATUS
Herbert Wilsch, Unterhaching, and Hermann Muller, Munich, Germany, assignors to Agfa-Gevaert Aktiengesellschaft, Leverkusen, Germany
Filed Apr. 2, 1970, Ser. No. 25,102
Claims priority, application Germany, Apr. 5, 1969,
P 19 17 697.7
Int. Cl. G03b 1/22, 21/44
U.S. Cl. 352—194
10 Claims

ABSTRACT OF THE DISCLOSURE

A film transporting mechanism for use in a motion picture projector comprises a shaft which rotates the shutter and first and second axially movable advancing cams which respectively impart to the pull-down movements necessary to effect forward and rearward transport of motion picture film. The cams are movable axially of the shaft by a shifter device so that one thereof imparts to the pull-down movement by way of a suitable follower. The face of the second cam differs from the face of the first cam to the extent necessary to compensate for the clearance with which the claw of the pull-down extends into the perforations of motion picture film. This insures that the frames of such film register accurately with the gate and with the optical system not only during forward but also during rearward transport of the film.

BACKGROUND OF THE INVENTION

The present invention relates to cinematographic apparatus in general, and more particularly to improvements in film transporting mechanisms for cinematographic apparatus, especially for motion picture projectors. Still more particularly, the invention relates to improvements in the construction, mounting and configuration of cams which impart necessary movements to the pull-down so that the latter's claw can transport the motion picture film forwardly or rearwardly.

SUMMARY OF THE INVENTION

An object of the invention is to provide a simple, reliable and compact film transporting mechanism which insures that the frames of motion picture film are in accurate alignment with the optical system during forward as well as during rearward transport of motion picture film.

Another object of the invention is to provide a film transporting mechanism which does not necessitate a change in the direction of rotation of the prime mover when the user wishes to change from forward transport to rearward transport of motion picture film, or vice versa.

A further object of the invention is to provide a film transporting mechanism which can be utilized in presently known cinematographic apparatus and which can be properly manipulated by persons having little or no knowledge of the construction of such apparatus.

An additional object of the invention is to provide a film transporting mechanism which comprises a relatively small number of inexpensive parts.

The invention is embodied in a film transporting mechanism for cinematographic apparatus which utilize perforated motion picture film, particularly for motion picture projectors. The mechanism comprises a pull-down having a claw or an analogous film engaging portion and arranged to perform first and second recurrent movements during which the claw periodically extends into the perforations of motion picture film with a predetermined clearance to thereby respectively advance the film stepwise forwardly and rearwardly, coaxial first and second rotary advancing cams which respectively have first and second cam faces and are movable axially to and from an operative position in which the first and second cam faces respectively impart to the pull-down the first and second recurrent movements to thus effect forward or rearward transport of the film, drive means for rotating the advancing cams, and shifter means for moving the cams to and from the operative position.

In accordance with a feature of the invention, the configuration of the second cam face differs from the configuraton of the first cam face to compensate for the aforementioned clearance and to thus insure that each film frame is in accurate alignment with the gate and the optical system of the cinematographic apparatus not only during forward but also during rearward transport of the film. The two cam faces are preferably substantially mirror symmetrical with reference to a plane which includes the common axis of the advancing cams.

The film transporting mechanism further includes a suitable in-and-out cam which causes the claw to extend into or to be withdrawn from the adjoining perforation in synchronism with the operation of advancing cams. The drive means for the advancing cams and the in-and-out cam preferably includes a shaft on which the advancing cams are movable axially and which preferably forms part of the shutter mechanism, i.e., the shaft can rotate one or more shutter blades.

The novel features which are considered as characteristic of the invention are set forth in particular in the appended claims. The improved film transporting mechanism itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of a film transporting mechanism which embodies the invention; and FIG. 2 is a sectional view as seen in the direction of arrows from the line II—II of FIG. 1.

DESCRIPTION OF THE PREFERRED EMBODIMENTS

Referring first to FIG. 1, there is shown a drive shaft 1 which is rotated by the motor (not shown) of a motion picture projector and rotates the sleeve-like hub 2 of a ring-shaped in-and-out cam 4. The hub 2 is separably secured to the drive shaft 1 by a radial screw 3. The cam 4 cooperates with a helical spring 5a to impart in- and out-movements to a film transporting member 5 of the type known as claw pull-down. The pull-down 5 is actuated by a motion transmitting member 6 having a first follower 6a which tracks the face of the cam 4 and a second follower 6b which tracks the face of one of two advancing cams 8 and 9 respectively serving to effect forward and rearward movement of motion picture film. The movements which are imparted to the pull-down 5 by the face of the cam 4 take place in the axial direction of the shaft 1, i.e., at right angles to the plane of the film, not shown. The movements which the advancing cam 8 or 9 imparts to the pull-down 5 take place substantially at right angles to the axis of the shaft 1 and lengthwise of the motion picture film.

The advancing cams 8, 9 are provided with a common sleeve-like hub 7 which rotates with the drive shaft 1 and is movable thereon axially in and counter to the direction indicated by the arrow B. As shown in FIG. 2, the lobes of the cams 8 and 9 are angularly offset with reference to each other and their peripheral cam faces are substantially mirror symmetrical with reference to a plane including the axis of the shaft 1. Furthermore, the throw of at least that portion of the cam 9 which effects actual rearward movement of the film exceeds somewhat the throw of the cam 8 to compensate for the unavoidable clearance with which the film engaging claw of the pulldown 5 enters the perforations of motion picture film and which must be taken into account when the direction of film transport is reversed, i.e., when the claw of the pulldown 5 receives motion by way of the cam 9 and follower 6b.

The hub 7 further carries an intermediate cam or guide member 110 having peripheral faces 10 and 11 which insure smooth transition of the tip of the follower 6b from the peripheral cam face of the cam 8 to the peripheral cam face of the cam 9 or vice versa. The cams 8, 9, 110 are slipped onto the hub 7 and are urged against a flange 7a by two nuts 7b, 7c which mesh with the externally threaded right-hand end portion of the hub 7.

The shifter device 13 for moving the assembly including the hub 7 and cams 8, 9, 110 axially of the shaft 1 (and for simultaneously insuring that the cams 8, 9 rotate with the in-and-out cam 4) comprises an axially parallel pin 12 which extends through a bore of the hub 2 and a notch 7d of the flange 7a so that its right-hand end portion bears against the adjacent end face 9a of the cam 9. The lefthand end portion of the pin 12 abuts against the flange 13a of a shifter sleeve 13b which is rotatable on the shaft 1 and can be moved in the direction indicated by arrow B in response to counterclockwise pivotal movement of a shifter lever 14 having at its free end a head 14a which bears against the left-hand end face of the flange 13a. The lever 14 is fulcrumed on a pin 15 which also serves as a pivot for a manually operable second lever 16. The levers 14, 16 are coupled to each other by a helical spring 17. The spring 17 serves as a means for yieldably holding the levers 14, 16 in each of their two end positions. Suitable stops (not shown) are provided to arrest the lever 16 in each of its end positions (one such end position is indicated by broken lines, as at 16') and to hold the lever 14 in the solid-line position of FIG. 1. The shifter device 13 further includes a helical spring 21 which surrounds the drive shaft 1 and bears against the adjacent end face of the hub 7 to urge the end face 9a of the cam 9 against the pin 12. The spring 21 reacts against a sleeve 18 which is affixed to the shaft 1 by a radial screw 19 and includes a cylindrical portion 18a surrounding the spring 21 and serving as a carrier for a rotary shutter blade 20. The latter is provided with one or more cutouts (not shown) which admit scene light to a film frame once during each revolution of the drive shaft 1 and sleeve 18. The blade 20 can include several wings or sections.

FIG. 1 shows the advancing cam 8 in its operative position; thus, the pull-down 5 is ready to transport the film stepwise in a forward direction because the follower 6b is positioned to receive motion from the cam 8. The follower 6b engages that portion of the cam face on the cam 8 which is nearest to the axis of the drive shaft 1 and the follower 6a tracks that portion of the face of the in-and-out cam 4 which enables the spring 5a to hold the claw of the pulldown out of engagement with the nearest perforation of the film. As the shaft 1 rotates in the direction indicated by arrow A, the rising portion of the cam face on the cam 8 causes the claw of the pull-down 5 to perform a return stroke, i.e., to move upwardly, as viewed in FIG. 1, without causing any movement of the film. As the shaft 1 continues to rotate in the direction indicated by the arrow A, the in-and-out cam 4 causes the claw to enter the adjacent perforation and the cam 8 causes the claw to move downwardly, as viewed in FIG. 1, and to thus advance the film by the length of a frame. The spring 5a thereupon withdraws the claw from the perforation and the claw performs a return stroke in the aforedescribed manner.

In order to reverse the direction of film transport, the user pivots the lever 16 in the direction indicated by the arrow C whereby the spring 17 snaps over and pivots the lever 14 to the broken-line position of FIG. 1. The head 14a pushes the flange 13a in the direction indicated by arrow B so that the pin 12 moves in the same direction and shifts the cams 8, 9, 110 against the opposition of the spring 21. The flange 13a comes to rest when it abuts against the adjacent end face of the hub 2. During such axial movement of the cams 8, 9 and 110, the follower 6b travels along the faces 11, 10 and engages the cam face of the advancing cam 9 when the latter assumes its operative position. The face of the cam 9 is offset with reference to the face of the cam 8 to the extent indicated in FIG. 2 so that the claw of the pull-down 5 enters the adjacent perforation of the film in the lowermost position of the follower 6b (as viewed in FIG. 1) and transports the film rearwardly during upward movement in response to rotation of the drive shaft 1 in the direction indicated by the arrow A.

An important advantage of the improved film transporting mechanism is that the direction of film transport can be changed without necessitating a change in the direction of rotation of the drive shaft 1 and by resorting to a very simple, compact and relatively inexpensive combination of elements. As stated before, the face of the cam 9 is somewhat different from the face of the cam 8 so that the cam 9 automatically compensates for the unavoidable clearance with which the claw of the pull-down 5 enters the perforations. This renders it unnecessary to carry out adjustments for the purpose of making sure that each frame of the film is in accurate alignment with the film gate. The plane of the gate is normal to the axis of the shaft 1. The difference between the configurations of faces on the cams 8 and 9 corresponds to the amount of clearance between the upper edge of a perforation and the claw of the pull-down 5 when the latter transports the film in a forward direction.

Another advantage of the film transporting mechanism is that the shaft 1, which can be said to form part of the shutter, simultaneously serves to rotate the in-and-out cam 4 and the advancing cams 8, 9 (by way of the cam 4).

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a cinematographic apparatus utilizing perforated motion picture film, particularly in a motion picture projector, a film transporting mechanism comprising a pulldown having a film engaging portion and arranged to perform first and second recurrent movements during which said portion thereof periodically extends into the perforations of motion picture film with a predetermined clearance to thereby respectively advance the film stepwise forwardly and rearwardly; coaxial first and second rotary advancing cams, said cams respectively having first and second cam faces and being movable axially to and from an operative position in which said first and second cam faces respectively impart to the pull-down said first and second recurrent movements, the configuration of said second cam face being different from that of said first cam face to compensate for said clearance; drive means for rotating said advancing cams, said drive means comprising a rotary shaft; shifter means for moving said cams to and from said operative position; and a common annular hub for said cams, said hub surrounding said shaft and being movable axially therealong to thereby place the selected one of said cams into said operative position.

2. In a cinematographic apparatus utilizing perforated motion picture film, particularly in a motion picture projector, a film transporting mechanism comprising a pull-down having a film engaging portion and arranged to perform first and second recurrent movements during which said portion thereof periodically extends into the perforations of motion picture film with a predetermined clearance to thereby respectively advance the film stepwise forwardly and rearwardly; coaxial first and second rotary advancing cams, said cams respectively having first and second cam faces and being movable axially to and from an operative position in which said first and second cam faces respectively impart to the pull-down said first and second recurrent movements, the configuration of said second cam face being different from that of said first cam face to compensate for said clearance; follower means operatively connected with said pull-down and arranged to track the face of that cam which dwells in said operative position; drive means for rotating said cams; shifter means for moving said cams to and from said operative position; and guide means interposed between said cams and arranged to guide said follower means during shifting of said cams to place a selected cam into said operative position.

3. A film transporting mechanism as defined in claim 2, further comprising a common annular hub for said advancing cams and said guide means, said guide means comprising at least one annular guide face disposed between said cam faces.

4. In a cinematographic apparatus utilizing perforated motion picture film, particularly in a motion picture projector, a film transporting mechanism comprising a pull-down having a film engaging portion and arranged to perform first and second recurrent movements during which said portion thereof periodically extends into the perforations of motion picture film with a predetermined clearance to thereby respectively advance the film stepwise forwardly and rearwardly; coaxial first and second rotary advancing cams, said cams respectively having first and second cam faces and being movable axially to and from an operative position in which said first and second cam faces respectively impart to the pull-down said first and second recurrent movements, the configuration of said second cam face being different from that of said first cam face to compensate for said clearance; drive means for rotating said cams, said drive means comprising a rotary shaft and said cams being movable axially of said shaft; and shifter means for moving said cams to and from said operative position, said shifter means comprising a sleeve surrounding a portion of said shaft and means for moving said sleeve axially to thereby move a selected cam into said operative position.

5. A film transporting mechanism as defined in claim 4, further comprising follower means operatively connected with said pull-down and arranged to track the face of that advancing cam which dwells in said operative position.

6. In a cinematographic apparatus utilizing perforated motion picture film, particularly in a motion picture projector, a film transporting mechanism comprising a pull-down having a film engaging portion and arranged to perform first and second recurrent movements during which said portion thereof periodically extends into the perforations of motion picture film with a predetermined clearance to thereby respectively advance the film stepwise forwardly and rearwardly; coaxial first and second rotary advancing cams, said cams respectively having first and second cam faces and being movable axially to and from an operative position in which said first and second cam faces respectively impart to the pull-down said first and second recurrent movements, the configuration of said second cam face being different from that of said first cam face to compensate for said clearance; rotary in-and-out cam means for said pull-down; drive means for rotating said advancing cams, said drive means including a shaft fixed to said in-and-out cam means and means for rotating said advancing cams in response to rotation of said in-and-out cam means; and shifter means for moving said advancing cams to and from said operative position.

7. A film transporting mechanism as defined in claim 6, further comprising follower means operatively connected with said pull-down and arranged to track the face of that advancing cam which dwells in said operative position.

8. A film transporting mechanism as defined in claim 6, wherein said cam faces are substantially mirror symmetrical with reference to a plane including the common axis of said advancing cams.

9. A film transporting mechanism as defined in claim 6, wherein said shifter means comprises means for biasing said first advancing cam into said operative position.

10. A film transporting mechanism as defined in claim 6, further comprising a rotary shutter driven by said shaft.

References Cited

UNITED STATES PATENTS

| | | | |
|---|---|---|---|
| 3,402,007 | 9/1968 | Gerlach | 352—194 X |
| 3,181,174 | 4/1965 | Griffioen et al. | 352—180 |
| 3,471,227 | 10/1969 | McClellan et al. | 352—173 X |
| 3,583,801 | 6/1971 | Roth | 352—173 |

LOUIS R. PRINCE, Primary Examiner

J. W. ROSKOS, Assistant Examiner

U.S. Cl. X.R.
226—51; 352—173